H. C. GUSTAFSON.
TRUCK.
APPLICATION FILED OCT. 12, 1915.

1,170,248.

Patented Feb. 1, 1916.
2 SHEETS—SHEET 1.

WITNESSES:

J. H. Phillips
C. E. Trainor

INVENTOR
HANS C. GUSTAFSON,

BY Munn & Co.

ATTORNEYS

H. C. GUSTAFSON.
TRUCK.
APPLICATION FILED OCT. 12, 1915.
1,170,248.
Patented Feb. 1, 1916.
2 SHEETS—SHEET 2.
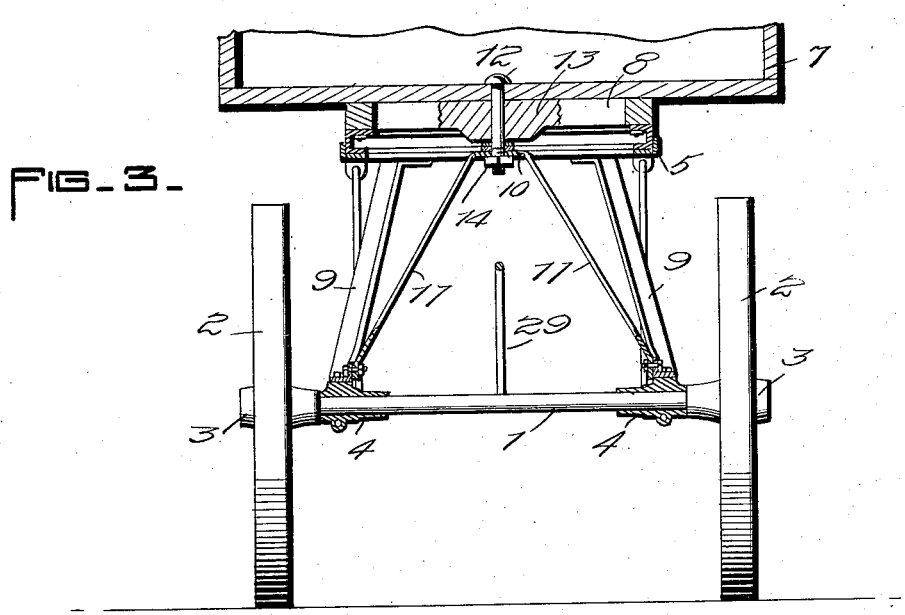
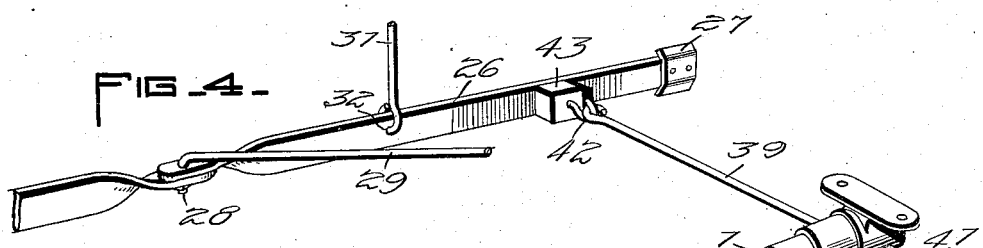
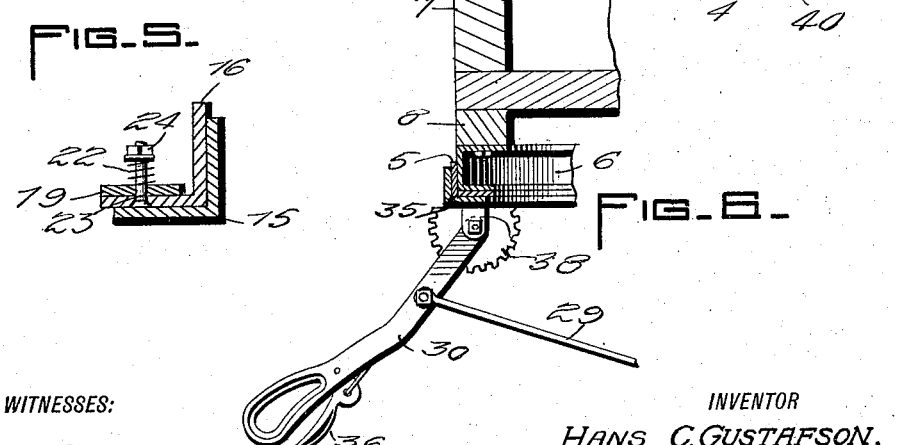
WITNESSES:
INVENTOR
HANS C. GUSTAFSON,
BY Munn & Co.
ATTORNEYS

UNITED STATES PATENT OFFICE.

HANS CHRISTIAN GUSTAFSON, OF ARLINGTON, IOWA.

TRUCK.

1,170,248.  Specification of Letters Patent.  Patented Feb. 1, 1916.

Application filed October 12, 1915. Serial No. 55,519.

*To all whom it may concern:*

Be it known that I, HANS C. GUSTAFSON, a citizen of the United States, and a resident of Arlington, in the county of Fayette and State of Iowa, have invented certain new and useful Improvements in Trucks, of which the following is a specification.

My invention is an improvement in trucks, and the invention has for its object to provide a front truck for hand controlled vehicles, wherein the truck is pivotally connected to the body of the vehicle to permit the vehicle to be guided, and wherein brake mechanism is provided capable of being operated from the front end of the truck for applying or releasing the brakes, and wherein a sliding handle frame is provided capable of being expanded or contracted and having latch mechanism for holding the same in adjusted position.

Figure 1:
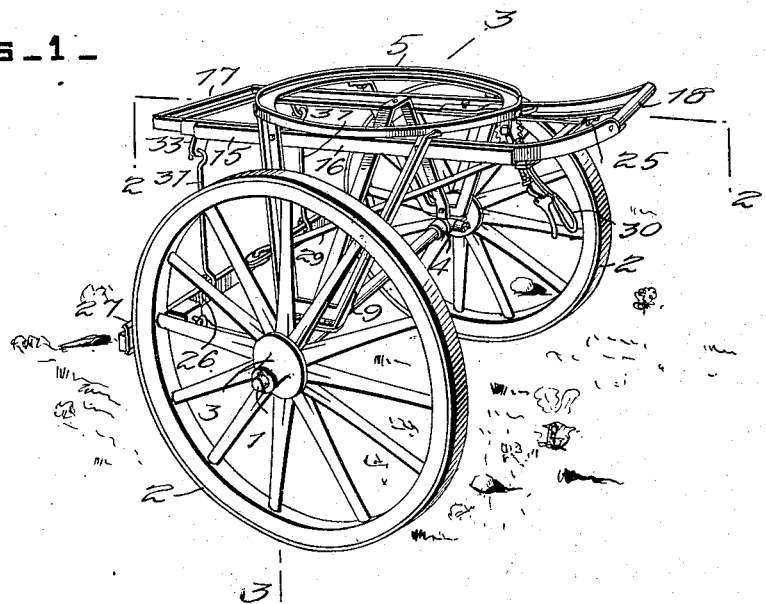
Figure 2:
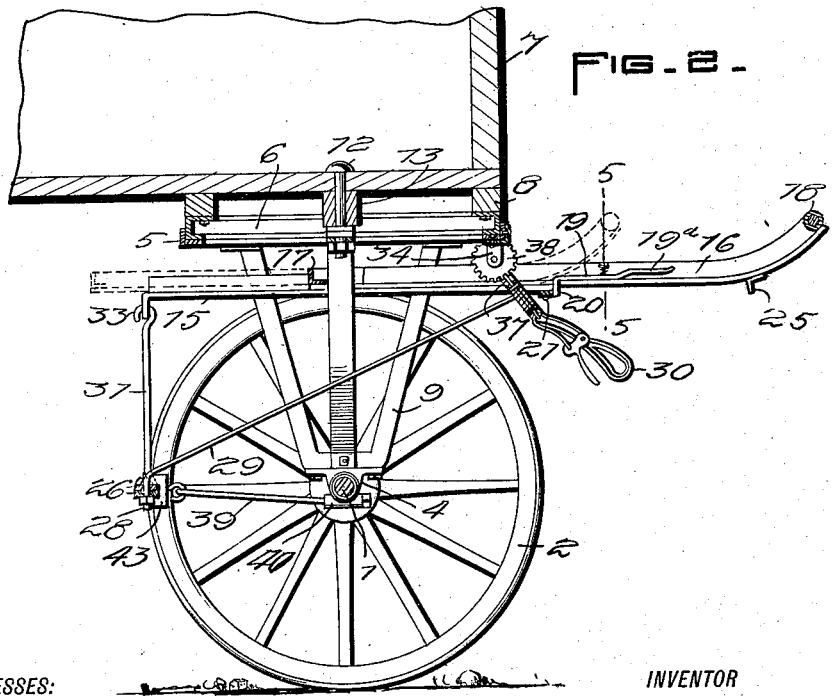

In the drawings: Figure 1 is a perspective view of the improved truck; Figs. 2 and 3 are vertical sections at right angles to each other, taken substantially on the lines 2—2 and 3—3 of Fig. 1; Fig. 4 is a perspective view of a portion of the brake mechanism; Fig. 5 is a section on the line 5—5 of Fig. 2; and Fig. 6 is a section through the fifth wheel.

The present embodiment of the invention comprises an axle 1, having at each end a wheel 2, the hubs 3 of the wheels being journaled on the axle. A bearing sleeve 4 is mounted on the axle near each wheel, and the bearing sleeves support the outer member 5 of a fifth wheel.

The said outer member is of angle material, as shown, arranged with its horizontal portion on the inner side of the vertical portion and at the lower edge of the vertical portion, and the inner or upper member 6 of the fifth wheel is secured to the body 7 of the truck, in spaced relation, by means of a ring 8 of wood or the like, which is arranged between the said member and the body.

The inner or upper section 6 of the fifth wheel is of channel material, as shown, the side walls of the channel extending inwardly, and the body of the member and the lower side wall fit within the angle of the outer member 5 with a fit sufficiently loose to permit the said members to turn with respect to each other freely, but sufficiently tight to prevent rattling or play between the members.

The lower or outer section of the fifth wheel is supported from the sleeves 4 by means of V-shaped brackets 9, each of the said brackets comprising a body secured transversely of a bearing sleeve 4 and diverging arms, which extend upwardly and are rigidly connected with the lower section of the fifth wheel.

The body 7 is connected to the axle rotatably, by means of a yoke-shaped bracket comprising a body 10 and arms 11 diverging from the body, the lower ends of the arms being connected to the bearing sleeves 4, and the body of the yoke-shaped member is pivoted to the body 7 of the vehicle by means of a king bolt 12. This bolt is passed downward through the body 7, and through a bearing block 13, and then through the body of the yoke-shaped member, and the bolt is engaged by a nut 14 below the body of the yoke-shaped member.

Guide bars 15 of angle material are secured to the arms of the brackets 9, transversely of the said arms, just below the section 5 of the fifth wheel, and these guide bars extend beyond the fifth wheel at each end of the said bars. The guide bars 15 are of angle material as shown, as are also the brackets 9, and a substantially rectangular frame is mounted to slide in the guide members. This frame comprises parallel side bars 16, a rear connecting cross bar 17, and a connecting roller 18 at the front of the side bars.

The side bars are bent upwardly at their front ends, and the roller 18 connects the said bent up ends, and forms a handle for permitting the truck to be easily operated. The handle 16—17—18 may occupy the full line or dotted line position of Fig. 2, the said handle sliding in the guides 15, and latch mechanism is provided for holding the handle frame in the full line position. This latch mechanism is arranged at each of the bars 16, and the said mechanism comprises a latch plate 19 fitting on the horizontal portion of each of the members 16, and having at its rear end a depending lug 20, for engaging in front of a cross bar 21 which connects the front ends of the guide bars. The front end of each latch plate 19 is offset upwardly as shown at $19^a$, to form a handle and a coil spring 22 is provided for normally holding each latch plate in engaging position. Each of the springs 22 encircles a bolt 23, which is passed upwardly through the horizontal portion of the adjacent side bar 16, and through the body portion 19 of the adjacent latch plate. The spring is arranged between the latch plate and a stop 24 on the bolt, the stop, in the present instance being constituted by a nut and washer, and the stop is adjustable on the bolt to vary the tension of the spring.

It will be noticed from an inspection of Fig. 5 that the head of the bolt is countersunk so that it does not interfere with the movement of the handle frame. When it is desired to release the latch mechanism to return the handle frame to the dotted line position of Fig. 2, it is only necessary to press downward on the offset portion 19ª of the latch plates. This will release the lugs 20 from the cross bar 21 and the handle frame may be moved rearwardly until the stops 25 engage the cross bar. These stops 25 are in the form of angle brackets secured to the horizontal portions of the bar 16, at such point that they will engage the cross bar 21 when the handle frame is in innermost position.

Brake mechanism is also provided in connection with the truck, the said mechanism comprising a pair of brake levers 26 which are pivoted together at their adjacent ends, and the outer end of each brake lever has a brake shoe 27 for engaging the tire or periphery of the adjacent wheel 2. The levers 26 are pivotally connected by means of an angular threaded lug 28 on one end of an operating link 29. This lug is passed downwardly through registering openings in the adjacent ends of the levers, and is engaged by a nut below the said levers. The adjacent ends of the levers are given a quarter turn as shown in Fig. 4, and are lapped upon each other to bring the openings for receiving the lugs 28 into register.

The link 29 extends upwardly and forwardly to a connection with an operating lever 30 to be later described, and the brake levers are suspended from the rear ends of the guide members 15 by means of links 31. Each of these links 31 is provided with a hook at each of its ends, and the hooks at the lower ends engage openings 32 in the brake levers, said openings being intermediate the ends of the levers and nearer their inner ends than their outer ends. The upper hook of each link 3 engages an opening in a depending lug 33 at the rear end of the adjacent guide bar 15. Thus the brake levers are suspended in proper position with respect to the wheels, and with the brake shoes 27 at the peripheries of the wheels.

The lever 30 is pivoted between a pair of depending lugs 34 on an angle bracket 35 which is secured to the outer or lower fifth wheel section. Latch mechanism is provided in connection with the lever for holding it in adjusted position. The said mechanism comprises a latch lever 36, which is connected to the usual latch pawl or ratchet 37, mounted to slide on the lever, and spring pressed toward a toothed wheel 38 which is rigid with the lugs 34 or the bracket 35. By means of the lever, the brake shoes 27 may be swung toward or from the wheels.

It will be evident that when the free end of the lever 30 is swung rearwardly, the pivotal connection between the levers 26 will also be swung rearwardly, bringing the brake shoes 27 into contact with the peripheries of the wheels.

Mechanism is provided for connecting the outer ends of the levers with bearing sleeves 4, to limit the rearward swinging of the said outer ends. This mechanism, as shown more particularly in Fig. 4, comprises links 39, each of which is passed at its front end through a sleeve 40 arranged transversely of the adjacent bearing sleeve 4, and a nut 41 is threaded onto the link in front of the said sleeve. The rear end of the link 39 has a hook, which engages a hook 42 on a block 43 secured to the front face of the adjacent brake lever, near the brake shoe 27.

The handle frame may occupy either the full line or dotted line position of Fig. 2, and it may be held in the full line position by means of the latch mechanism 19. When pulling the truck, the full line position will be preferred, while when pushing the truck, the dotted line position will be preferred.

It will be understood that the handle frame is in extended position during the handling of the truck, whether pulling forward or backward. The latches hold the handle frame in extended position whether pulling or pushing. In pulling, the rear end of the handle frame comes in contact with the yoke-shaped bracket that connects the king bolt with the body, and this bracket is strong and firm enough to withstand the forward movement. In pulling the latches bear against the cross bar.

In practice, the fifth wheel is connected to the body of the truck by cross sills. Thus the bottom of the truck is provided with four sills extending longitudinally of the bottom and the top fifth wheel section bolts snugly onto the sills, thus bringing the bottom in close contact. Oil holes are provided through the bottom of the body to permit the fifth wheel to be kept well oiled.

I claim:

1. A truck, comprising a wheel supported axle, a fifth wheel comprising inner and outer sections, the outer section being of angle material and the inner section being of channel material, and having its channel facing inwardly, said inner section resting in the outer section and being rotatable therein, V-shaped brackets, each comprising a body arranged transversely of the axle and arms extending upwardly and connected to the inner section, bearing sleeves on the axles for the bodies of the brackets, a V-shaped bracket comprising a body for pivotal connection with the body of the vehicle at the axis of the fifth wheel, and arms connected with the bearing sleeves, guide bars extending transversely of the first named brackets and parallel with each other, said guide bars being of angle material, and a sliding handle frame mounted in the guide bars and movable transversely of the axle, said frame being substantially rectangular and having a roller journaled at the front end thereof, releasable latch mechanism for holding the handle frame in its forward position, and stops for limiting the rearward movement of the frame.

2. A truck comprising a wheel supported axle, a lower fifth wheel section supported above the axle, guide bars extending transversely of the axle and rigid with the fifth wheel support, and a substantially rectangular handle frame mounted to slide on the guide bars transversely of the axle, and having means for limiting its rearward movement, and releasable latch mechanism for holding the frame in forward position, said handle frame having a roller at its front end, and the latch mechanism comprising plates mounted on the side members of the frame and having depending lugs for engaging the guide bars to limit the rearward movement of the frame, and springs normally pressing the latch plates downward.

3. A truck comprising a wheel supported axle, a lower fifth wheel section supported above the axle, guide bars extending transversely of the axle and rigid with the fifth wheel support, and a substantially rectangular handle frame mounted to slide on the guide bars transversely of the axle, and having means for limiting its rearward movement, and releasable latch mechanism for holding the frame in forward position.

4. A truck comprising a wheel supported axle, a fifth wheel above the axle, supports rigid with the fifth wheel and journaled on the axle near the ends thereof, guide bars secured to the supports transversely of the axle and parallel with each other, a substantially rectangular handle frame mounted to slide on the guide bars and having means for limiting the rearward movement of the said frame, releasable latch mechanism for holding the frame in forward position, brake mechanism supported by the guide bars and the fifth wheel supports, and means at the front of the vehicle for operating the brake mechanism.

HANS CHRISTIAN GUSTAFSON.

Witnesses:
E. R. TODHUNTER,
JOHN HUTCHISON,
E. J. ENGELDINGER.

Copies of this patent may be obtained for five cents each, by addressing the "Commissioner of Patents. Washington, D. C."